US009927956B2

(12) United States Patent
Rivero

(10) Patent No.: US 9,927,956 B2
(45) Date of Patent: Mar. 27, 2018

(54) SYSTEM AND METHOD FOR CATEGORIZING AND RANKING CONTENT FOR PRESENTATION

(71) Applicant: Likeopedia LLC, Miami, FL (US)

(72) Inventor: Omar Rivero, Miami, FL (US)

(73) Assignee: LIKEOPEDIA, LLC, Miami, FL (US)

( * ) Notice: Subject to any disclaimer, the term of this patent is extended or adjusted under 35 U.S.C. 154(b) by 0 days.

(21) Appl. No.: 14/995,702

(22) Filed: Jan. 14, 2016

(65) Prior Publication Data
US 2017/0205964 A1    Jul. 20, 2017

(51) Int. Cl.
G06F 3/048    (2013.01)
G06F 3/0482   (2013.01)
H04L 29/08    (2006.01)
G06Q 50/00    (2012.01)

(52) U.S. Cl.
CPC ........... *G06F 3/0482* (2013.01); *G06Q 50/01* (2013.01); *H04L 67/10* (2013.01); *H04L 67/2838* (2013.01)

(58) Field of Classification Search
CPC .............................. G06F 3/0482; H04L 67/10
See application file for complete search history.

(56) References Cited

U.S. PATENT DOCUMENTS

| | | | |
|---|---|---|---|
| 8,510,380 B2 | 8/2013 | Faller et al. | |
| 8,700,636 B2 * | 4/2014 | Kao | G06F 17/3089 707/748 |
| 8,756,224 B2 * | 6/2014 | Dassa | G06F 17/30893 707/723 |
| 8,768,863 B2 | 7/2014 | Gubin et al. | |
| 8,869,017 B2 | 10/2014 | Piantino et al. | |
| 8,886,836 B2 | 11/2014 | Luu | |
| 8,943,136 B2 | 1/2015 | Faller et al. | |
| 8,977,611 B2 | 3/2015 | Tseng | |
| 9,077,675 B2 * | 7/2015 | Harris | G06Q 50/01 |
| 9,083,767 B2 | 7/2015 | Tseng | |
| 9,110,953 B2 | 8/2015 | Steinberg et al. | |
| 9,117,249 B2 | 8/2015 | Schacht et al. | |
| 9,152,675 B2 | 10/2015 | Fller et al. | |
| 9,769,180 B2 * | 9/2017 | Bedi | H04L 63/105 |
| 2002/0198866 A1 * | 12/2002 | Kraft | G06F 17/30864 |
| 2007/0118802 A1 * | 5/2007 | Gerace | G06F 17/30867 715/738 |

(Continued)

OTHER PUBLICATIONS

"How Reddit ranking algorithms work" by Amir Salihefendic; Dec. 8, 2015. URL: https://medium.com/hacking-and-gonzo/how-reddit-ranking-algorithms-work-ef111e33d0d9#.fjn0jo.

(Continued)

*Primary Examiner* — Dino Kujundzic
(74) *Attorney, Agent, or Firm* — Potomac Law Group, PLLC; Charles B. Lobsenz; Brian H. Buck

(57) ABSTRACT

A system and methodology which provides a content management functionality that presents content to a viewing user in a manner which is compelling, logically organized and in a fashion which is intended to display the content of most interest to a user more prominently. According to various embodiments of the present invention, presentation to a viewing user may be in the form of a newsfeed which presents content as a list of content entries which are classified by subject matter and ranked for prioritization in viewing prominence according to various criteria.

18 Claims, 5 Drawing Sheets

(56) References Cited

U.S. PATENT DOCUMENTS

| | | | | |
|---|---|---|---|---|
| 2008/0010337 | A1* | 1/2008 | Hayes | G06Q 10/00 709/202 |
| 2009/0157667 | A1* | 6/2009 | Brougher | G06Q 10/063 |
| 2012/0117059 | A1* | 5/2012 | Bailey | G06F 17/30867 707/723 |
| 2012/0278329 | A1* | 11/2012 | Borggaard | G06F 17/30699 707/738 |
| 2013/0024788 | A1* | 1/2013 | Olsen | G06Q 10/10 715/753 |
| 2013/0318156 | A1* | 11/2013 | Friedman | H04L 29/06047 709/203 |
| 2015/0032737 | A1* | 1/2015 | Badenes | G06Q 30/0631 707/723 |
| 2015/0347357 | A1* | 12/2015 | Maughan | G06F 17/2235 715/205 |
| 2016/0267086 | A1* | 9/2016 | Liden | G06F 17/30598 |

OTHER PUBLICATIONS

"EdgeRank is Dead: Facebook's News Feed Algorithm Now has Close to 100K Weight Factors" by Matt McGee; Aug. 16, 2013. URL: http://marketingland.com/edgerank-is-dead-face.

* cited by examiner

SYSTEM AND METHOD FOR CATEGORIZING AND RANKING CONTENT FOR PRESENTATION

RELATED APPLICATION

The present invention is related to similar subject matter of co-pending and commonly assigned U.S. patent application Ser. No. 14/826,278 entitled "TIME SENSITIVE SYSTEM OF SCORING FOR ARRANGING STORIES ON NEWSFEEDS" filed on Aug. 14, 2015, which is hereby incorporated by reference.

FIELD OF THE DISCLOSURE

Embodiments of the present invention relate generally to systems and methods for categorizing and ranking content, including posts associated with social media.

BACKGROUND

Social media applications are currently in widespread use. These applications are typically made available through software systems which are interconnected through the internet and other networks. This allows for robust sharing of user information, content, communications and other data.

In one aspect, these applications permit users to post content such as short notes, videos, photos, text and other information to the social media network. Users may also post links to other content, share previously posted content and supplement existing content. When other users view this collective content, such content is often presented in the form of a newsfeed which typically exists as a scrollable list of content relevant to and/or desired by the viewing user.

The actual presentation of a viewing user's newsfeed may be formed according to a number of characteristics. For example, the newsfeed might be limited to content posted and/or sourced from individuals with which the viewing user shares some form of relationship. Similarly, content in a viewable newsfeed may also be limited to specific subject matter of interest to the viewing user. In some cases, the user may have some control over what is and what is not included in the newsfeed presented to them while in other cases, the makeup of the content may be largely or completely controlled by the application provider instead of the user.

In addition to determining which content is included in a newsfeed and which content is not included, some systems and methods employ decision support in connection with priorities in terms of how the content is presented. For example, some systems may order the content according to the time of posting, possibly showing the most recent posting first with the remaining postings being presented in order of time of posting with the older postings further down the page or requiring page scrolling to view.

While social media applications of today offer an unprecedented opportunity to share and organize information in real time (or near real time) among large numbers of individuals with definable relationships, these applications and methodologies do suffer from some drawbacks.

For example, as a viewing user's network grows via new connections and as that same user's interests expands via indications of interest in new types of subject matter, the amount of content presented to the user can become overwhelming. This may have the unfortunate effect of "burying" content that is of most interest to the user (which he or she may never see) and/or distracting the user with content that is of relatively lesser or no interest to the user. As a result, users may be less inclined to use these applications which, of course, is likely to have detrimental financial effects on those entities that provide these social media applications.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

It is a primary object of the present invention to overcome the limitations of the prior art.

It is another object of the present invention to provide a comprehensive system and methodology that provides users of social media applications and other content-based applications with a content presentation structure that is as useful and as well organized as possible.

It is a still further object of the present invention to provide a system and methodology for presenting content to viewing users according to areas of subject matter of specific interest to these viewing users.

It is a yet further object of the present invention to provide a system and methodology which permits a posting user to select the category and/or subcategory of posted content with which such content should be associated.

It is a yet further object of the present invention to provide a system and methodology which segments content with respect to display and viewing by viewing users according to the category and/or subcategory selected by the posting user.

It is another object of the present invention to provide a system and method offering separately segmentable categories of newsfeeds within a single social media application platform.

It is yet another object of the present invention to provide a system and methodology for presenting content to viewing users which takes into account the relative importance/ranking that each specific viewing user attributes to each posting user.

It is a yet further object of the present invention to provide a system and methodology for presenting content to viewing users which takes into account the relative importance/ranking that a collective set of viewing users attributes to each posting user.

It is a still further object of the present invention to provide a system and methodology for presenting content to viewing users in a "newsfeed" type format in which content is ordered in a manner which takes into account more than just the chronological characteristics of such content.

It is an even further object of the present invention to provide a system and methodology for presenting content to users in a manner which reflects first the subject matter/categorization of the content, and then, secondarily, one or more other attributes of relevance to each specific viewing user.

It is a still further object of the present invention to provide a system and methodology which enables the ranking of posting users by subject matter/categorization and according to individual and group affinity for such users and/or the content provided by such users.

These and other objects of the present invention are achieved through the disclosed system and methodology which provides a content management functionality that presents content to a viewing user in a manner which is compelling, logically organized and in a fashion which is intended to display the content of most interest to a user more prominently. According to various embodiments of the present invention, presentation to a viewing user may be in the form of a newsfeed which presents content (which may also be referred to herein as "stories") as a list of content entries which may be viewed in connection with an applicable application.

According to the teachings of the present invention, in preferred embodiments thereof, the system may offer viewing users the choice of one or more newsfeed formats which each order and present content according to a differing rules base. One such format may present the content solely on the basis of reverse chronological order (e.g. the most recently posted content is shown at the top of the list) or some other rules base which takes into account only chronological characteristics associated with the posting and/or creation time for the content. Other formats for presentation may specifically categorize content by subject matter type and then present and order only content relevant to the selected areas of subject matter. In turn, this selected content may then be ordered according to one or more criteria. Posting users may select the categorization (category, subcategory, etc.) for each posting/content element posted by the posting user.

In one embodiment, one such criterion for ordering is the ranking associated with either or both of: (i) the poster/uploader of the content; and/or (ii) the source of the content. Accordingly, and by way of example, if the overall user base for one or more social networks attribute a high value to a specific poster/uploader and/or content source, then all content associated with such poster/uploader/source may enjoy a relatively high prioritization in terms of presentation to viewing users. Alternatively, the rankings of posters/uploaders and/or sources of content may be determined by each individual user such that each individual user may ultimately impact the order of content displayed for his or her own purpose. It is also possible that both individual user and overall user base rankings may be combined to determine content display prioritization for viewing users as more fully described herein.

In one preferred embodiment, ranking within each category/subcategory is based solely on the overall user base "affinity" for each individual posting. Thus, for example, within a sports category, the postings with the largest number of likes attributed to them may be displayed first with other postings displayed below the first posting in order of the number of likes received. The number of likes received may be reflected by likes attributed to postings by users viewing the content regardless of the category in which the liking user happens to view the posting. So, for example, if a posting user happens to assign a posting to both the Football and Basketball subcategories of a Sports Category and that posting receives likes from viewing users viewing the posting in both subcategories, the collective amount of likes may be used for ranking purposes. In an alternative embodiment, rankings may be made based only on likes obtained on a category by category (or subcategory by subcategory) basis.

In some embodiments, various indicators may be used to determine what is meant by a "high value" as described above. For example, the number of "likes" or other indicia of affinity associated with a poster/uploader/content source may be used. Alternatively, or in addition, other attributes viewed to be of value in determining relative interest to viewing users may be employed. Examples include number of followers for the applicable poster/uploader/content source, number of connections associated with the applicable poster/uploader/content source as well as others.

Further features and aspects of the present invention will become apparent from the following detailed description of the exemplary embodiments in connection with reference to the attached drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1:
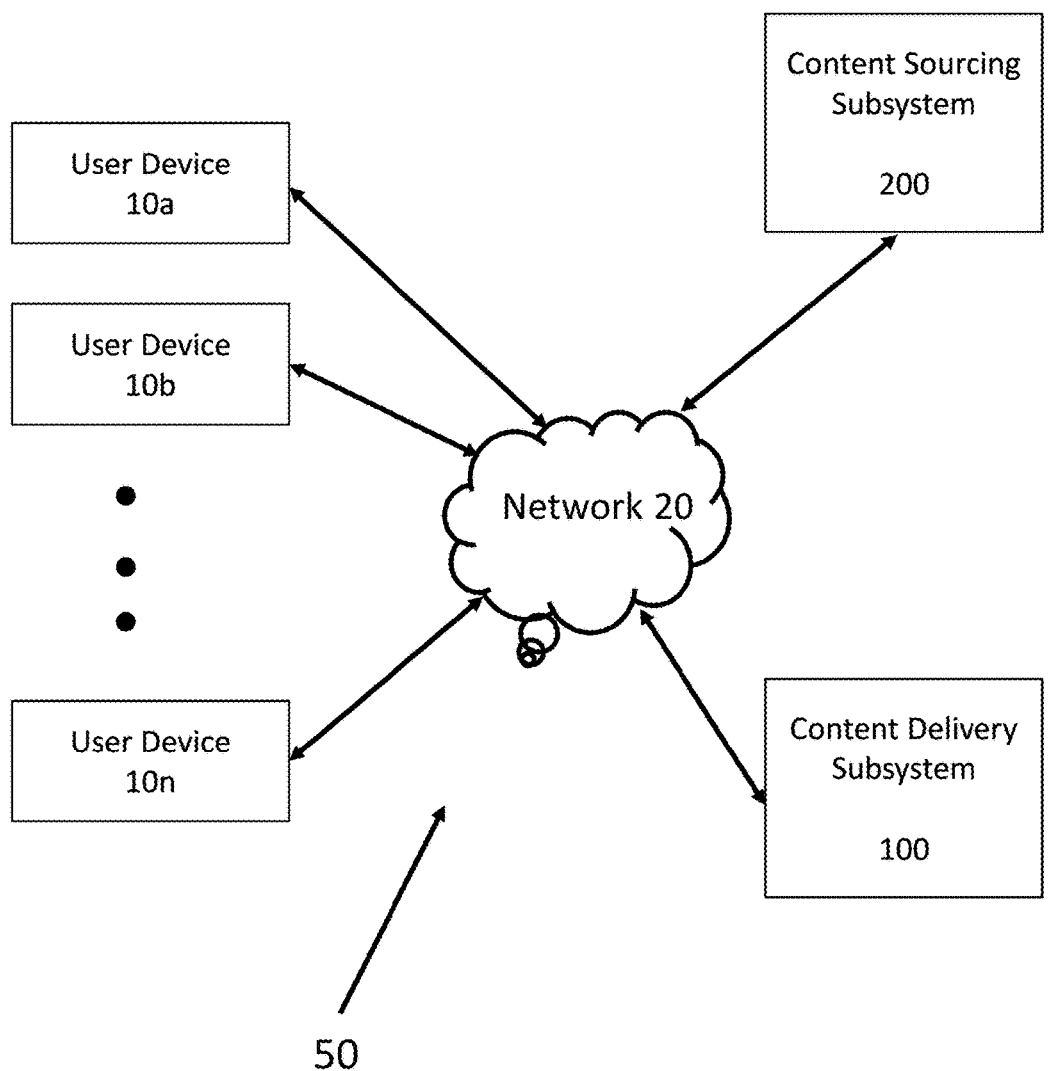
FIG. 1 is a block diagram illustrating the system of the present invention and the primary components thereof according to a preferred embodiment.

Embodiments of the present invention will now be disclosed in terms of various exemplary embodiments. This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

FIG. 1 is a block diagram illustrating the system of the present invention and the primary components thereof according to a preferred embodiment thereof. The system of the present invention may be implemented as a social networking system 50 that generates a newsfeed for a user to view when accessing system 50 and provides for selective control (inclusion and prioritization) of the content comprising the newsfeed. User devices 10, such as user device 10a, user device 10b and user device 10n communicate with content sourcing subsystem 200 and content delivery subsystem 100 via network 20. User devices 10 may comprise any devices associated with one or more users, such as smartphones, personal digital assistants, desktop and laptop computers, tablets and/or any other device capable of displaying information and receiving user input to allow user interaction with content sourcing subsystem 200 and/or content delivery subsystem 100.

While the teachings of the present invention are not necessarily limited to social media services, they do have particular application thereto. Thus, the following description assumes implementation in a social media environment although the scope of this invention should not be interpreted to be limited thereto. In some embodiments, content sourcing subsystem 200 and content delivery subsystem 100 may be integrated as a single service, possibly resident on a single server, while in other embodiments, the functionality may be distributed geographically, across various servers and/or as separate services.

In a social media context, a social network provider may comprise any entity that provides social networking services. More specifically, the social network provider may host one or both of content sourcing subsystem 200 and/or content delivery subsystem 100 in a role as an application service provider with primary system functionality resident on servers implementing content sourcing subsystem 200 and/or content delivery subsystem 100 although limited functionality (such as browser capability) may be resident on user devices 10.

The social network provider may host a website that allows one or more users to communicate with one another using user devices 10 and via the website. These users may interact through the sharing of content, messaging one another, connecting with each other though the creation of user networks and/or indicating affinity with one another or a lack thereof at various different levels.

Network 20 may comprise one or more conventional or proprietary networks using an appropriate network data transmission protocol. Examples of such networks include those based on some or all of the following technologies: PSTN, LAN, WAN, WiFi, WiMax, LTE, Internet, World Wide Web, Ethernet, other private and public wired and wireless networks, and the like.

Figure 2:
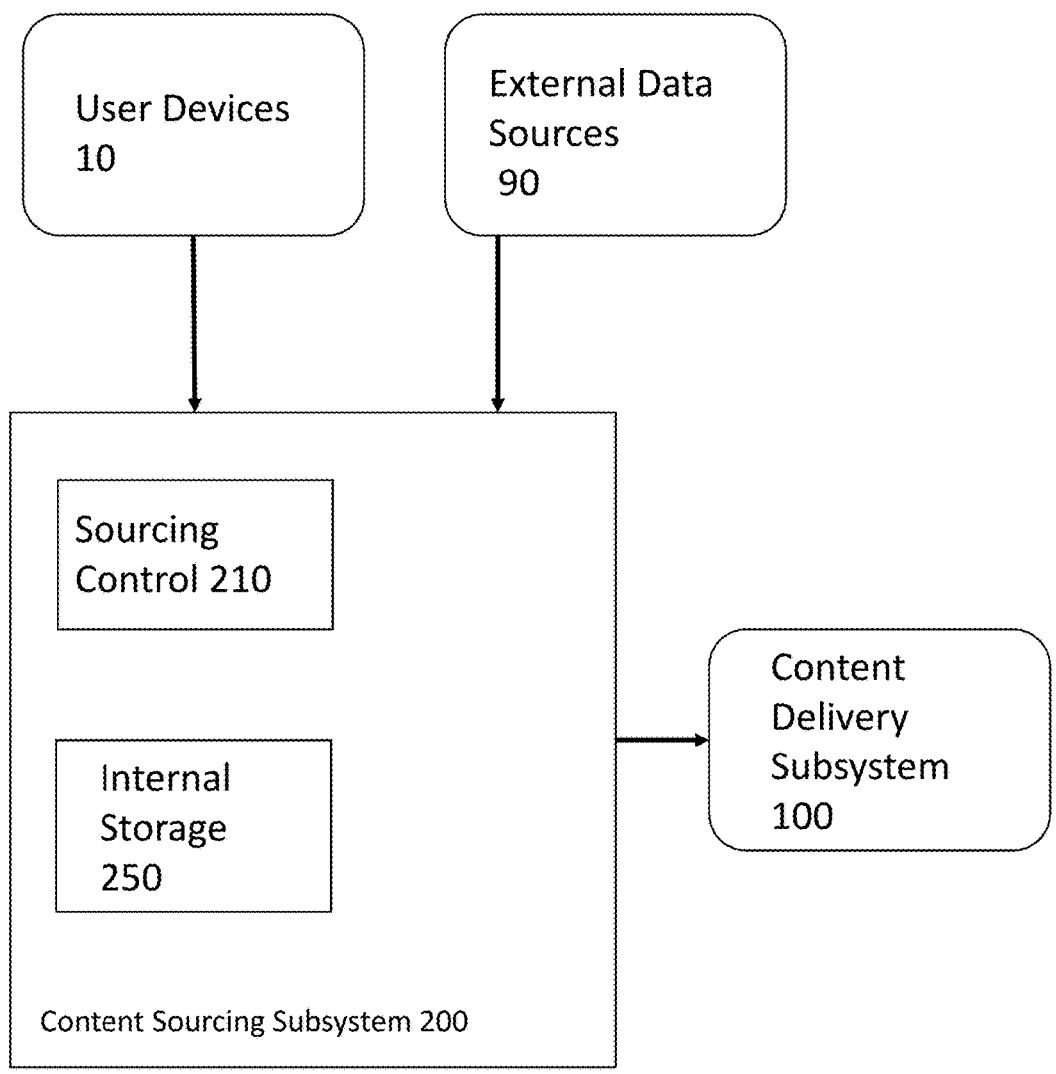
FIG. 2 is block diagram providing additional detail regarding the content sourcing subsystem 200 of the present invention according to a preferred embodiment.

Turning now to FIG. 2, it will be seen that the present invention may include content sourcing system ("CSS") 200 which interacts with user devices 10, external data sources 90 and content delivery subsystem 100 through wired and/or wireless network connections. In a preferred embodiment, CSS 200 includes sourcing control functionality 210 which controls the sourcing of content which is available through the social media application. CSS functions to obtain the universe of content which may be selectively made available to users of the social media application typically as directed by users via user devices 10. Content may be user generated and provided directly via user devices 10. Alternatively, or in addition, content may be sourced from one or more external data sources 90. For example, these external data sources may include news sources, article repositories, other social media platforms and/or any other source of content.

Content is sourced by CSS 200 under the direction and control of sourcing control 210 and, in some embodiments, stored in internal storage 250 for selective display to users via a newsfeed. Content may be stored as an actual copy of the content desired for display and/or via links to resources where that content may be referenced for display.

CSS 200 interacts with content delivery subsystem ("CDS") 100 in order that CDS 100 may access desired content for selective display under the control of CDS 100. As posting users add or reference content via user devices 10 for potential display to viewing users, that content is accessed under the control of CSS 200 and made available to CDS 100 as required for display.

Figure 3:
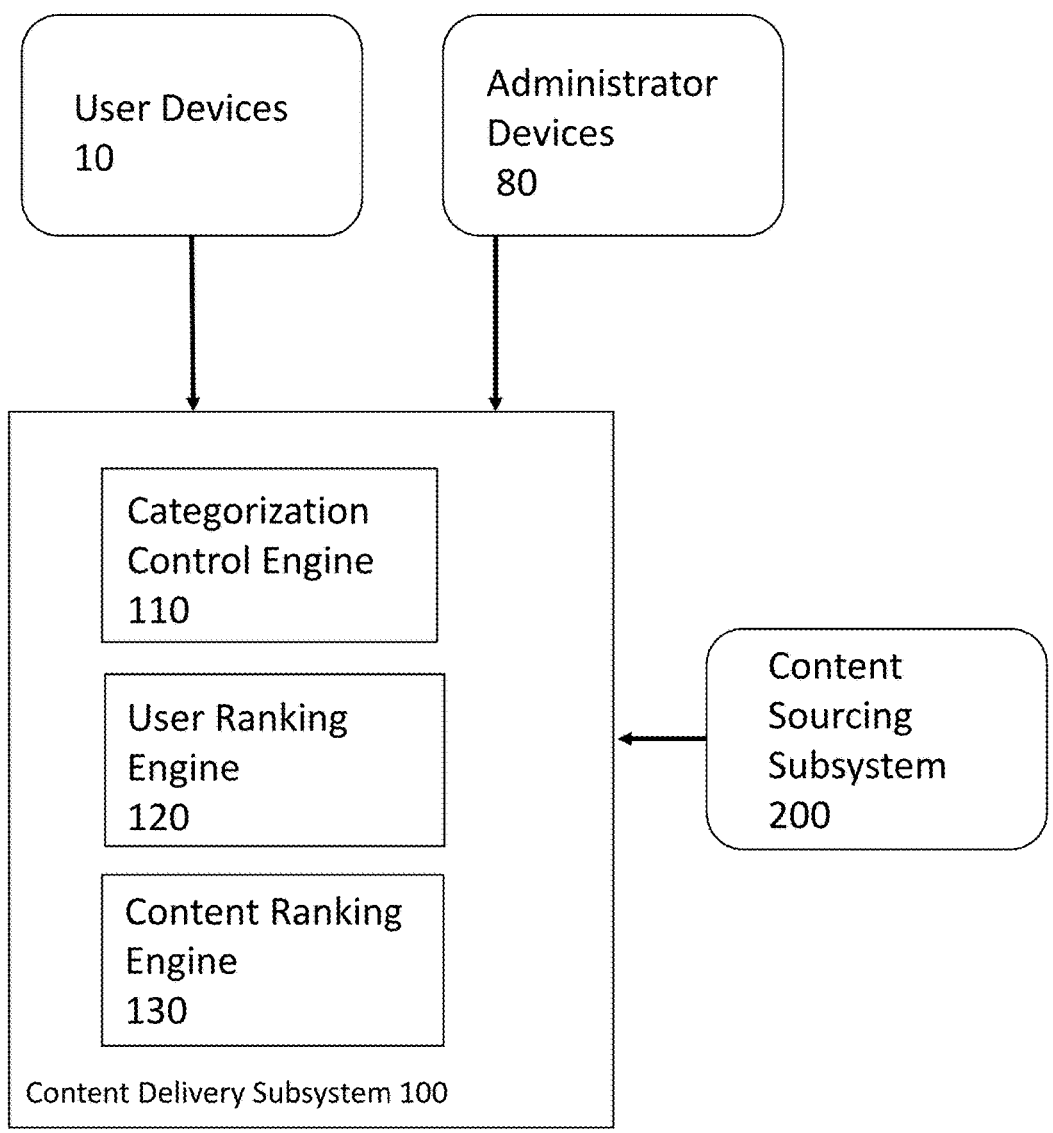
FIG. 3 is block diagram providing additional detail regarding the content delivery subsystem 100 of the present invention according to a preferred embodiment.

FIG. 3 is a diagram illustrating the primary components of content delivery subsystem 100 in a preferred embodiment thereof. CDS 100 functions to display content for viewing users according to the rules bases and teachings herein. In a preferred embodiment, user devices 10 interact with CDS 100 to request that a server hosting CDS 100 serve content in the applicable format. Administrator devices 80 may be devices similar to user devices 10, however, administrator devices 80 are used by administrators of the platform (social media or otherwise) in order to control and administrate the operation of CDS 100. CDS 100 also interacts with CSS 200, as described above, in that CSS 200 provides a library of available content to CDS 100 for selective display to viewing users as described herein below.

CDS 100 preferably includes various components offering the functionality required to select, prioritize and format content for display to viewing users according to the teachings of the present invention. According to the teachings of the present invention, content is displayable to viewing users according to a number of formats and according to a number of rules bases. These formats and rules bases are designed to allow the viewing user flexibility in how he or she desires to view content but more importantly, CDS 100 functions to offer unique display options which makes content which is most relevant to the viewing user's interests the most prominent while relegating less relevant content to lower prominence.

According to the teachings of the present invention, content may be primarily sorted by subject matter. The control of these categories is managed by categorization control engine 110. Thus, categorization control engine 110 may control and offer a number of individually segmentable categories related to various subject matter classifications. For example, content may be accessed and grouped by primary category such as politics, sports, food, music, movies, technology, etc. Under each of these primary categories, subcategories at one or more logical levels below the primary categories may also be enabled. For example, the sports primary category may include subcategories for football, basketball, baseball, etc. Under these subcategories, further levels of categorization may also be provided such as pro football and college football under the football subcategory.

One unique feature of the present invention in a preferred embodiment is that each of these categories and/or subcategories may be operated and managed by CDS 100 as a separate "platform" with individual newsfeeds and content ranking algorithms applied to each such platform individual. In one sense, this provides the viewing user with ability, as a primary matter, to view only content related to subject matter which is of interest. This also provides the ability for a posting user to select one or more categorizations to be attributed to the content posted by the posting user. Other teachings of the present invention provide for content to be displayed in a way that is uniquely relevant to the viewing user but wherein content is organized by subject matter in order to eliminate all content which does not relate to a subject matter classification.

Categorization control engine 110 further functions to allow users (preferably via user devices 10) and/or administrators (preferably via administrator devices 80) to create new categories and subcategories for content subject matter classification. System 50 may be designed to allow some, complete or no user control over categorization and subcategorization.

Another component which is preferably included within CDS 100 is user ranking engine 120. According to the teachings of the present invention, user ranking engine 120 is preferably configured to rank content, sources of content and/or posting users according to various criteria. These criteria may be determined by each individual viewing user, groups of viewing users, the complete universe of viewing users and/or administrators of system 50. As such, the determining entity or entities may select which criteria should be considered by user ranking engine 120 and/or how much weight to afford each of the criteria in determining an overall ranking for content and/or each applicable posting user and/or source of content.

In a preferred embodiment of the present invention, user ranking engine 120 ranks posting users by assigning a score to each such posting user and CDS 100 will display a newsfeed to viewing users with content posted in sequential order of the ranking of the posting user posting the content. Alternatively, this same newsfeed can be configured such that viewing users will see content ordered by the ranking of the source of the content. This may be determined under the control of content ranking engine 130. As yet another possibility, the newsfeed will be presented in sequential order of the ranking of each content "story" itself. Again, this may be determined under the control of content ranking engine 130.

Significantly, content order can also be determined by some combination of the above. For example, the first content displayed in the newsfeed might be that content which has the highest collective ranking based on posting user, source and content story itself. Various weightings can be applied to each of these types of rankings as will be understood by one of skill in the art.

Rankings themselves may be based on a practically unlimited set or combination of criteria. For example, the following attributes may determine a ranking value for each of the possible ranking possibilities discussed above:

Ranking for Posting Users: likes received by all users, likes received by users subscribing to applicable subject matter categories, followers attributed to the user, number of posts attributed to the user, number of comments received with respect to posts made by that user, time relevance of postings, values assigned by an administrator, etc.

Ranking for Source of Content: values assigned by an administrator, number of pieces of content originating from the source, number of collective likes received for content associated with the source, number of followers attributed to that source, time relevance of available content, etc.

Ranking for Content Stories Themselves: values assigned by an administrator, number of collective likes received for content, number of comments associated with the content story, time relevance of content story, etc.

According to the teachings of the present invention, it is preferred that rankings are associated with each subject matter area/category. Thus, there may be a ranking order of all posting users associated with the sports category. Rankings may also be by subcategory and even further lower levels of categorization. For example, there may also be a ranking order of posting users associated with the football subcategory of sports. These same teachings apply to ranking if source of content and/or content stories themselves are used by CDS 100 to order content within the newsfeed presented to viewing users.

In a preferred embodiment of the present invention, CDS 100 is configured to consider time relevance of content in terms of presentation in a newsfeed. As such, the ranking criteria discussed above may be impacted by a time associated with the content. In this way, content that is no longer relevant (or less relevant) due to timing can be eliminated or displayed less prominently. Accordingly, CDS 100 may operate such that the rankings themselves are adjusted based on time. For example, when content is ordered by ranking of posting user, posting users that have not posted in a long time may suffer lower rankings because of this fact as noted above. Alternatively, in some embodiments, CDS 100 may fully eliminate from the newsfeed any content associated with a posting user that has not, for example, posted content in, for example, 6 months, regardless of an otherwise high ranking which would be attributed to that user.

This concept can also be applied to source of content and content itself. For example, any source of content that has not made available any content in a specific subject matter area/category within some pre-determined previous timeframe, may have all of its content eliminated from the newsfeed or displayed less prominently regardless of an otherwise high ranking for the content source. Similarly, any content itself that reaches a certain age from original posting may be eliminated from the newsfeed or displayed less prominently.

It will be noted again, that one key aspect of the present invention is that with respect to the above discussion, each of these rankings preferably occurs within a specific subject matter area/category such that the system essentially operates as a number of independent "platforms" with each platform associated with a targeted subject matter area. This has the unique benefit that viewing users interested in specific subject matter areas/categories can choose to view ONLY content associated with that subject matter area/category and then have that specific content ranked to dictate prominence and/or order of display within that subject matter area/category.

CDS 100 may be configured to allow some degree of viewing user control over the content that is displayed in each of that viewing user's newsfeeds for each desired subject matter area. For example, viewing users may select posting users and sources of content that they prefer to give more prominence in their newsfeed. This is implemented by adjusting the ranking criteria applied by either or both of user ranking engine 120 and/or content ranking engine 130 per viewing user preferences. Similarly, viewing users may be permitted to adjust the newsfeed such that certain posting users and/or sources of content are assigned lower rankings resulting in lower prominence or elimination from the newsfeed presentation as desired.

Figure 4:
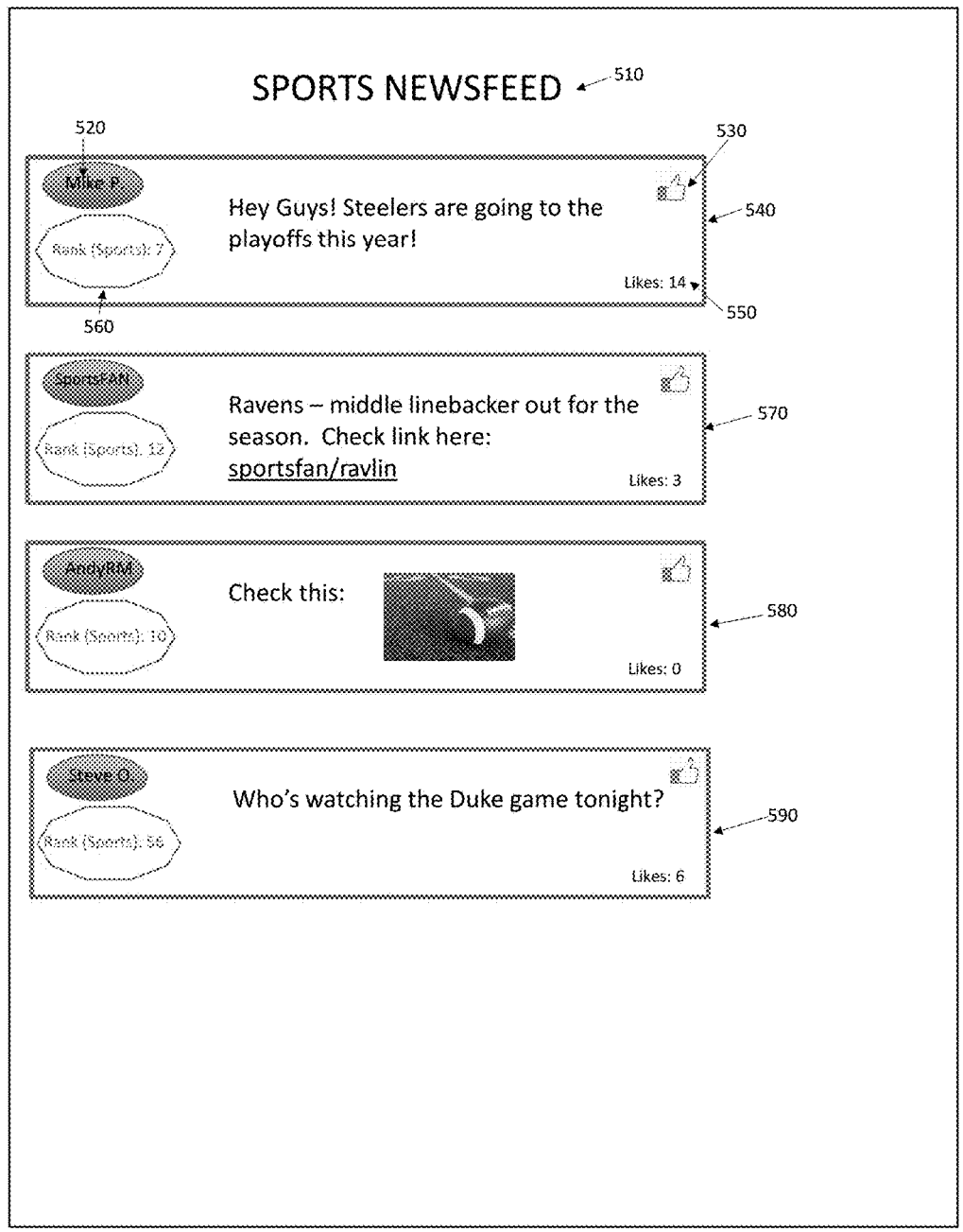
FIG. 4 is an illustration showing an exemplary newsfeed displayed to a viewing user and incorporating the ranking and prioritization methodologies according to preferred embodiments of the present invention.

FIG. 4 is an example newsfeed display which may be displayed to a viewing user according to the teachings of the present invention in a preferred embodiment thereof. In this example, a newsfeed which may be presented to a viewing user interested in the subject matter area of sports is shown. Again, this presentation is merely exemplary and a practically unlimited number of formats and presentations may be generated while still remaining within the scope and spirit of the present invention. A header 510 for the newsfeed denotes the newsfeed as a sports newsfeed. Each of the content entries 540, 570, 580 and 590 represent content posted and/or linked to by a different posting user. In this example, the posting user/content source identification is identified by indicia 520. In this example, the first displayed content entry 540 was provided by "Mike P.", while content entry 570 is indicated as being sourced from "SportsFAN" which may be either an individual user or a designated media content source.

Content entries may also contain a "like" button 530 which allows viewing users to indicate affinity for the content and/or the user/source of the content. The number of these "likes" received may be indicated via indicia 550. In some embodiments, viewing users may also be permitted to express alternative viewpoints with respect to the content such as dislikes, inappropriate content, etc. Some or all of these viewpoints may be considered in determining the ranking for the user/content source as desired.

In addition, the content entries also preferably contain indicia 560 indicative of the rank for the content/user/source. As discussed above, these rankings determine the relative position on the viewed page for the content entry and/or some other aspect of prominence to be applied to the content entry (e.g. highly ranked content entries may also be highlighted, displayed in a special color, bolded, etc.)

In this example, content entries 540, 570, 580 and 590 are ordered by ranking in sequential order on the page. Note that content entry 570 is displayed higher on the page than content entry 580 despite having a rank of 12 versus 10 for content entry 580. This is to illustrate that in some embodiments, content entries which are provided by content sources, such as media outlets (in this case the SportsFAN media outlet) may be separately ranked and/or prioritized as against content entries provided by individuals or other sources. Again, this is at the discretion of the operator of system 50 and CDS 100 may be configured as desired.

Note that in a preferred embodiment of the present invention, rankings are achieved on a per category basis. Thus all rankings shown in FIG. 4 relate specifically to those achieved in the Sports category. Content entries associated with other subject matter areas will preferably be ranked separately as against one another in each other subject matter area.

It will be noted that in a preferred embodiment of the present invention, content is segregated by subject matter area (which is also referred to herein as categories and subcategories) and then ranked for ordered presentation within each subject matter area/category/sub-category. Again, in a preferred embodiment, ranking within subject matter area/category/sub-category is solely based on "affinity" for each posting which is represented by the number of likes received by each posting from the collective set of viewing users across all categories or with respect to only to the specific category.

Thus, for example, a posting of content that appears in the "Sports" category that has received 30 likes by the collective set of viewing users would be ranked higher (and thus displayed on the viewed page above) another posting in the "Sports" category that has received only 20 likes. While various other ranking possibilities have been described herein, it is important to note that the preferred ranking criteria is as described immediately above.

Another important aspect of the present invention is that "categories" as described herein may also be characterized as being related to audiences rather than specific subject matter. By way of example, a posting regarding gun control might be selected for inclusion in a "Democrats" audience category or a "Republicans" audience category. This could be in addition to a subject matter category/sub-category classification such as Politics category and then Gun Control Issues sub-category under that. This provides the unique benefit of allowing a posting user to select the audience to which he/or she believes the content to be most relevant as opposed to or in addition to just a subject matter area. From the viewing user perspective, this allows viewing user to select newsfeeds that relate to specific shared characteristics of audiences rather than just subject matter. So, for example, a viewing user may be interested in politics but only those postings which would likely appeal to Democrats as opposed to Republicans. In this case, the viewing user could select for viewing only the Democrats category and/or subcategory as applicable.

The viewing users may also subscribe to categories/subcategories of interest such that they are notified with respect to new content in their areas of interest. In this case, a viewing user interested in receiving notifications which appeal to Democrats could subscribe to the Democratic audience category as opposed to a more general Politics subject matter category.

Figure 5:
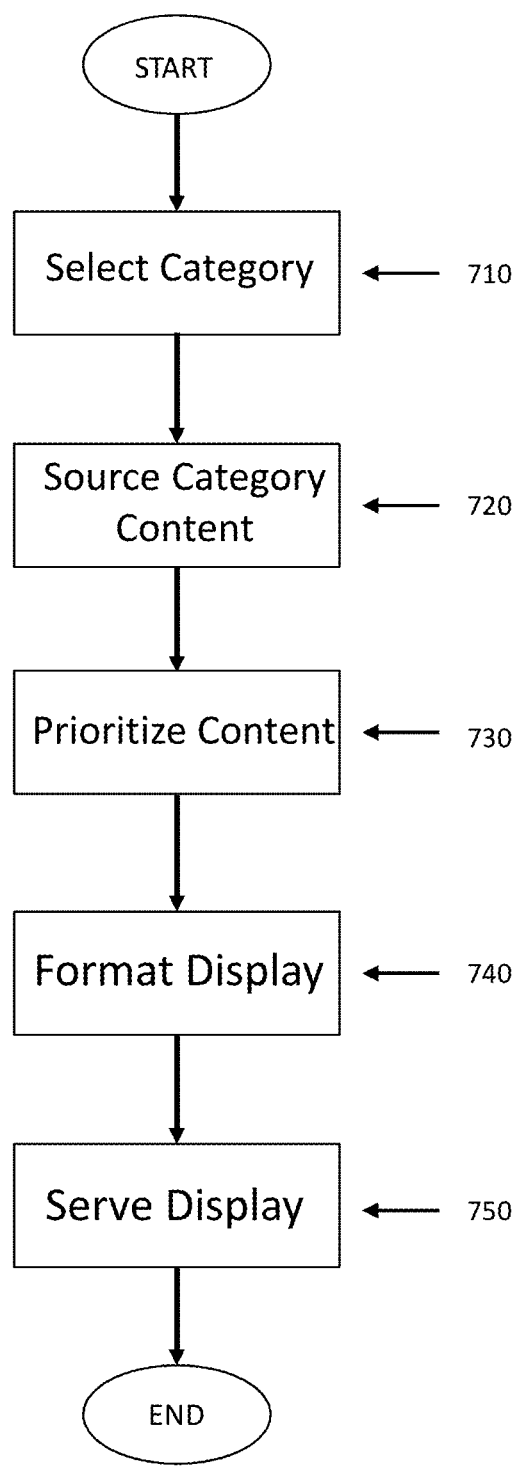
FIG. 5 is a flowchart illustrating a method of selecting, ordering and prioritizing the display of content in a newsfeed type format according to a preferred embodiment of the present invention.

FIG. 5 is a flowchart illustrating a method of operating system 50 in order to source and present content to a viewing user, according to an embodiment of the present invention. This process may be invoked in connection with a viewing user session with system 50, for example. When a viewing user desires to view content through system 50, this user preferably is prompted to select a category at step 710. As discussed above, this category may be associated with a particular subject matter of interest and/or any other way in which information may be categorized by the nature of the content. Again, as noted above, step 710 may also comprise prompting for and accepting from the viewing user various sub-classifications and/or sub-categorizations to identify the content of specific interest. For example, step 710 may result in a viewing user selecting a professional football subcategory of football which is, in turn a subcategory of sports. In a preferred embodiment of the present invention, processing associated with step 710 may be accomplished by and under the control of content delivery subsystem 100 as described above.

Once the categorization is selected in step 710, processing continues to step 720 at which time content associated with the selected category (or subcategory, as applicable) is sourced for possible inclusion in the display ultimately presented to the viewing user. In a preferred embodiment, this content is sourced under the control of content sourcing subsystem 200 which has access to a multitude of content made available from user devices, external data sources and possibly internal databases and/or links thereto as described above.

In a preferred embodiment, the sourced content may include the full universe of all possible posts/stories/etc. associated with the selected category and which is available through content sourcing subsystem 200. However, it should be noted that, again in a preferred embodiment, this full universe of content is necessarily limited in the time dimension. As such, and as determined by either or both of the system administrator and/or the viewing user, only content that is recent enough to be deemed relevant will be included. In an alternative embodiment, a combination of time relevancy and other factors (such as ranking as described above and below) may be used to determine the universe of content to start with.

For example, in one embodiment, only content which was published and/or posted within the last 30 days may be included in the universe of content provided by CSS 200 to CDS 100. In another example, only content which is either published/posted within the last 30 days OR has a ranking over a certain level (e.g. top ten posting users) may be included in the universe of content provided by CSS 200 to CDS 100 for potential display to a viewing user. Various other possibilities for determining the requirements for content to be included within the universe of content provided for potential display are possible. The teachings of the present invention are therefore not limited to the examples described above.

Once the universe of content for potential display has been sourced in step 720, processing proceeds to step 730 where content is selected and prioritized for display as described in detail above. This processing is preferably performed under the control of content delivery subsystem 100 according to the teachings herein. As noted above, this selection and prioritization may comprise the determination as to whether a specific posting/story/etc. should be included in the display at all (i.e. even if a viewing user were to scroll down to the very end of the content display, it may not be available). This may be determined under the control of CDS 100 based on viewing user selections and/or administrative controls. For example, a viewing user may be permitted to eliminate all content posted by a specific posting user and/or content source regardless of ranking.

Similarly, content that is determined to be part of the set of content to ultimately displayed to the user may then be prioritized based on ranking. This ranking methodology is described in detail above. Using these rankings, CDS 100 may prioritize content for the viewing user in many different ways. For example, higher ranking content may be displayed higher on a page, bolded, underlined, highlighted, located on a specific area of a page, presented in a larger font, as well as many other possibilities all of which are within the scope and spirit of the present invention.

Once content is selected and prioritized for display in step 730, processing continues to step 740. In this step, CDS 100 preferably formats the display in a way that is aesthetically pleasing and which reflects the ranking and display criteria discussed above. This formatting may be undertaken in any way that enables the display of this information to a viewing user on a user device 10. In some embodiments, viewing is via a web browser so formatting is performed to leverage browser based functionality to provide an optimum display for the viewing user. This may include HTML coding and/or other web browser based coding languages and functionalities.

Finally, at step 750, the formatted content resulting from step 740 is served to the viewing user at a user device 10. According to a preferred embodiment of the present invention, the content is served under the control of CDS 100 and sent via network 20 to a user device 10 for presentation.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present invention has been described with reference to specific illustrative embodiments, modifications and variations of the present invention may be constructed without departing from the spirit and scope of the present invention as set forth in the following claims.

While the present invention has been described in the context of the embodiments explicitly discussed herein, those skilled in the art will appreciate that the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A content management system comprising:
one or more processors configured to execute computer program modules, the computer program modules comprising:
a content sourcing module configured to receive sets of content elements sourced from posting users, wherein each set of said content elements is associated with at least one specific category;
a content categorization module configured to process said sets of content elements for display to a viewing user;
a content ranking module configured to rank said sets of content elements for an associated display prominence; and
a content display module configured to display said sets of content elements according to the display prominence as determined by said content ranking module,
wherein each of said sets of content elements comprises a content defining a subject matter thereof and an identification of at least one of the posting users, and said ranking of said sets of content elements comprises a ranking of the identity of said at least one of the posting users, in which the ranking of said identity comprises ranking a first category of said identity differently than a second category of said identity, said categories of identity defining a name of said at least one of the posting users and a type of said at least one of the posting users comprising an individual and a non-individual.

2. The content management system of claim 1 wherein said content display module is further configured to display said sets of content elements for viewing by said viewing user in the form of a newsfeed.

3. The content management system of claim 2 wherein said associated display prominence corresponds to page ordering within said newsfeed.

4. The content management system of claim 3 wherein a respective set of content elements having a higher ranking as determined by said content ranking module is displayed above another respective set of content elements having a relatively lower ranking within said newsfeed.

5. The content management system of claim 1 wherein said content ranking module is further configured to rank said sets of content elements by a total number of likes attributed to each of said sets of content elements by viewing users viewing said sets of content elements across said at least one specific category.

6. The content management system of claim 1 wherein said content ranking module is further configured to rank said sets of content elements by a total number of likes attributed to each respective set of said content elements by a collection of viewing users viewing said sets of content elements across all categories with which said sets of content elements have been associated.

7. The content management system of claim 6 wherein said all categories with which said sets of content elements have been associated comprises a plurality of subject matter classifications.

8. The content management system of claim 1 wherein said at least one specific category comprises at least one subject matter classification.

9. The content management system of claim 1 wherein said at least one specific category comprises at least one intended audience for said content element.

10. A method for managing and displaying content comprising:
- receiving sets of content elements sourced from posting users, wherein each of said sets of content elements is associated with at least one specific category;
- processing said sets of content elements for display to a viewing user such that each of said sets of content elements displayed to said viewing user is associated with said at least one specific category;
- ranking each of said sets of content elements for an associated display prominence; and
- displaying said sets of content elements according to the display prominence as determined in said ranking,
- wherein each of said sets of content elements comprises a content defining a subject matter thereof and an identification of at least one of the posting users, and said ranking of said sets of content elements comprises a ranking of the identity of said at least one of the posting users, in which the ranking of said identity comprises ranking a first category of said identity differently than a second category of said identity, said categories of identity defining a name of said at least one of the posting users and a type of said at least one of the posting users comprising an individual and a non-individual.

11. The method of claim 10 wherein said sets of content elements are displayed in the form of a newsfeed.

12. The method of claim 11 wherein said associated display prominence corresponds to page ordering within said newsfeed.

13. The method of claim 12 wherein a respective set of content elements having a higher ranking as determined in said ranking is displayed above another set of content elements having a relatively lower ranking within said newsfeed.

14. The method of claim 10 wherein said ranking comprises ranking said sets of content elements by a total number of likes attributed to each of said sets of content elements by viewing users viewing said sets of content elements across said at least one specific category.

15. The method of claim 10 wherein said ranking comprises ranking said sets of content elements by a total number of likes attributed to each of said sets of content elements by a collection of viewing users viewing said sets of content elements across all categories with which said sets of content elements have been associated.

16. The method of claim 15 wherein said all categories with which said sets of content elements have been associated comprises a plurality of subject matter classifications.

17. The method of claim 10 wherein said at least one specific category comprises at least one subject matter classification.

18. The method of claim 10 wherein said at least one specific category comprises at least one intended audience for said content element.

\* \* \* \* \*